United States Patent [19]

Oka et al.

[11] Patent Number: 4,897,513

[45] Date of Patent: Jan. 30, 1990

[54] ROTARY SWITCH

[75] Inventors: Tsumoru Oka; Mituaki Shinraku, both of Miyagi, Japan

[73] Assignee: Alps Electric Co., Ltd., Tokyo, Japan

[21] Appl. No.: 301,783

[22] Filed: Jan. 25, 1989

[30] Foreign Application Priority Data

Mar. 11, 1988 [JP] Japan .............................. 63-31644[U]
Mar. 11, 1988 [JP] Japan .............................. 63-31645[U]

[51] Int. Cl.[4] ...................... H01H 21/62; B62D 65/00
[52] U.S. Cl. ................................ 200/11 EA; 200/11 J
[58] Field of Search ............ 200/11 C, 11 E, 11 E A, 200/11 G, 11 J, 11 K, 61.89, 61.91

[56] References Cited

U.S. PATENT DOCUMENTS

| | | | |
|---|---|---|---|
| 3,255,319 | 6/1966 | Paine | 200/11 E A |
| 3,596,013 | 7/1971 | Pihl | 200/11 E A X |
| 3,602,656 | 8/1971 | Anderson et al. | 200/11 C |
| 3,939,313 | 2/1976 | Hagashi et al. | 200/11 J |
| 3,944,761 | 3/1976 | Nicholl et al. | 200/11 E A |

Primary Examiner—J. R. Scott
Attorney, Agent, or Firm—Guy W. Shoup; Paul J. Winters; Stephen L. Malaska

[57] ABSTRACT

A rotary switch has a synthetic resin substrate on the surface of which a plurality of fixed contacts are arranged in a concentric fashion, and a holder rotatable over the expanse of the substrate, including the fixed contacts. A conductor plate supported to the holder is formed with swelled contacts which act as movable contacts. A rib is positioned so that the conductor plate contacts the rib when the switch is in the off position, thereby lifting the movable contacts from the surface of the substrate. A substantially hour glass shaped slit is used to separate and insulate the fixed contacts. The wide portions of the slit act as reservoirs for conductive wearing powder, thereby delaying a short circuit due to wearing powder accumulation. Thus, the switch alleviates wear of the movable contacts and enhances switching accuracy.

3 Claims, 7 Drawing Sheets

ROTARY SWITCH

BACKGROUND OF THE INVENTION

1. Field of the Invention

This invention relates to a switch adapted for use in a position sensor or the like of an automobile transmission and, more particularly, to a switch which is switched on or off by sliding a conductor plate resiliently supported to a holder between a fixed contact disposed on a substrate and the resin face of the substrate.

2. Description of the Prior Art

The conventional switch of this type is disclosed and known, for example, in U.S. Pat. No. 3,602,656.

FIGS. 11 to 14 show the switch disclosed in the above-mentioned U.S. Patent. FIG. 11 is a plan view of the switch; FIG. 12 is a bottom view of the holder of the switch; FIG. 13 is a sectional view of the holder of the switch; and FIG. 14 is a sectional view taken along the line 14—14 of FIG. 12.

In FIG. 11, reference numeral 1 denotes a substrate made of synthetic resin. A plurality of wiring patterns 2 forming fixed contacts made of a copper material are arranged on the surface of the substrate 1. Numeral 3 denotes a metal cover sealed to the substrate 1, and circular rotary openings 4 are formed at the cover 3 and the substrate 1. Numeral 5 denotes a holder made of synthetic resin. A cylinder 5a having an elliptical operation opening 6 at its center protrudes from one end of the holder 5, and the cylinder 5a is rotatably inserted into the rotary openings 4 of the substrate 1 and the cover 3.

As apparent from FIGS. 12 to 14, first and second conductor plates 7 and 8 are held on the rear surface of the holder 5, and the conductor plates 7 and 8 are opposed to the substrate 1. The first conductor plate 7 has a circular opening 7a at the lateral end of the holder 5, an engaging pawl 7b at the other end, two contacts 7c and 7d to bridge over the engaging pawl 7b at both longitudinal ends of the holder 5, and a spring retainer 7e at its center. The first conductor plate 7 thus formed is mounted on the holder 5 so that one end of the coiled spring 9 is wound at the spring retainer 7e, the circular opening 7a is engaged with the conical cylinder or projection 5a so that conductor plate 7 is rockably supported with the projection 5a as a fulcrum, and the engaging pawl 7b is contacted with a step 5b to prevent conductor plate 7 dropping from the holder 5.

The second conductor plate 8 has engaging pawls 8a and 8b at both lateral ends of the holder 5, two contacts 8c and 8d near the bases of the engaging pawls 8a and 8b, respectively, and further a spring retainer 8e at its center. The second conductor plate 8 is mounted at the holder 5 so that one end of the coiled spring 10 is wound at the spring retainer 8e, and both the engaging pawls 8a and 8b are contacted with steps 5e and 5f in grooves 5c and 5d formed at both lateral ends of the holder 5 to prevent conductor plate 8 dropping from the holder 5.

The switch thus constructed is carried in a vehicle to couple the operation opening 6 of the holder 5 to the coupling pin of a shift lever, not shown. Accordingly, when a driver moves the shift lever to a predetermined position, the holder 5 correspondingly rotates with the rotary opening 4 at its axis, and the contacts 7c, 7d and 8c, 8d of the first and second conductor plates 7 and 8 are separably contacted with the respective wiring patterns 2 to output desired position signals, such as position signals and/or back light signals, etc. In this case, both the contacts 7c and 7d of the first conductor plate 7 move in the extending direction of two parallel rows of the wiring patterns 2 as designated by two-dotted lines in FIG. 11. However, since the first conductor plate 7 is rockably supported to the projection 5a by means of the resilient strength of the coiled spring 9, even if there is a slight stepwise difference between both the wiring patterns 2 or between the substrate 1 and the wiring pattern 2, the conductor plate 7 can slide on the substrate 1 and the wiring pattern 2. Similarly, both the contacts 8c and 8d of the second conductor plate 8 move in the extending direction of the group of the innermost wiring patterns 2 in FIG. 11. However, since the second conductor plate 8 is elevationally movably held along the grooves 5c and 5d by means of the resilient strength of the coiled spring 10, even if there is a slight stepwise difference between the substrate 1 and the wiring pattern 2, conductor plate 8 can slide thereon.

The above-described plural rows of the wiring patterns 2 are not always brought into coincidence with the movable range of the holder 5. In such a case, the contacts 7c, 7d and 8c, 8d of the first and second conductor plates 7 and 8 are slid on the surfaces of the substrate 1 and the wiring pattern 2 upon rotation of the holder 5 irrespective of the on/off switching process. Wearing of the contacts 7c, 7d and 8c, 8d thereby causes the timing of the contacts between 7c, 7d, 8c, 8d and the wiring pattern 2 to become unstable. In other words, wear of the contacts 7c, 7d and 8c, 8d presents a serious drawback by causing a decrease in the on/off switching accuracy.

Since the contacts 7c, 7d and 8c, 8d of the first and second conductor plates 7 and 8 further slide on the metal wiring pattern 2, conductive wearing powder is generated. The metallic wearing powder can cause the shortcircuit between a plurality of fixed contacts of the wiring pattern 2. The nearer the fixed contacts approach the sliding direction of the conductor plates, the earlier the shortcircuit tends to occur. Thus, in such a case, it is necessary to provide a wearing powder reservoir between the fixed contacts.

SUMMARY OF THE INVENTION

Accordingly, an object of this invention is to provide a switch which can eliminate the above-described disadvantages of the prior art and which can alleviate the wear of movable contacts to enhance the on/off switching accuracy.

In order to achieve the above and other objects, one aspect of the present invention provides a switch having a synthetic resin substrate arranged with a plurality of fixed contacts on the surface thereof, a holder movable in the extending direction of the fixed contacts, and a conductor plate supported to the holder for turning the switch on and off by separably contacting a movable contact provided at the conductor plate with the fixed contact. Also provided is a rib on the substrate projected along the moving direction of the holder which separates the movable contact from the surface of the substrate by contacting the conductor plate with the rib.

Further, there is provided according to another aspect of the invention a switch having the same arrangement as above and also comprising a stepwise slit formed between fixed contacts on the substrate so as to be narrowest at the center thereof coincident with the sliding locus of the movable contact and gradually wider from the sliding locus toward both outsides. Thus the slit 54 is formed with a substantially planar, hour glass shape.

According to the switch constructed as described above, the conductor plate slides in contact with the rib in the range irrespective of the on/off switching. Therefore, the movable contact is floated from the surface of the substrate, so that the movable contact is not worn in this range. Since the contact of the conductor plate with the rib is, on the other hand, released in the range of on/off switching, the movable contact slides on the fixed contact with a pressure determined by the spring. Therefor, the contact or the separation of the conductor plate and the fixed contact turns the switch on or off.

Further, in this invention, in view of the fact that the conductive wearing powder produced by the sliding of the movable contact is deposited at both sides of the sliding locus, the shape of the slit formed between the fixed contacts is devised. More specifically, when the slit is so formed as to be narrower at the center thereof and gradually wider toward both sides as described above, the wearing powder is efficiently deposited in the wide section outside the slit. This prevents a short-circuit between the fixed contacts due to the accumulation of wearing powder. The distance that the movable contact drops into the slit is reduced by the narrowing of the slit's center, thereby preventing the deterioration of the sliding contact.

The above and other related objects and features of the invention will be apparent from a reading of the following description of the disclosure and the accompanying drawings. The novelty thereof is pointed out in the appended claims.

DESCRIPTION OF THE PREFERRED EMBODIMENTS

An embodiment of the present invention will be described in detail with reference to the accompanying drawings.

Figure 1:
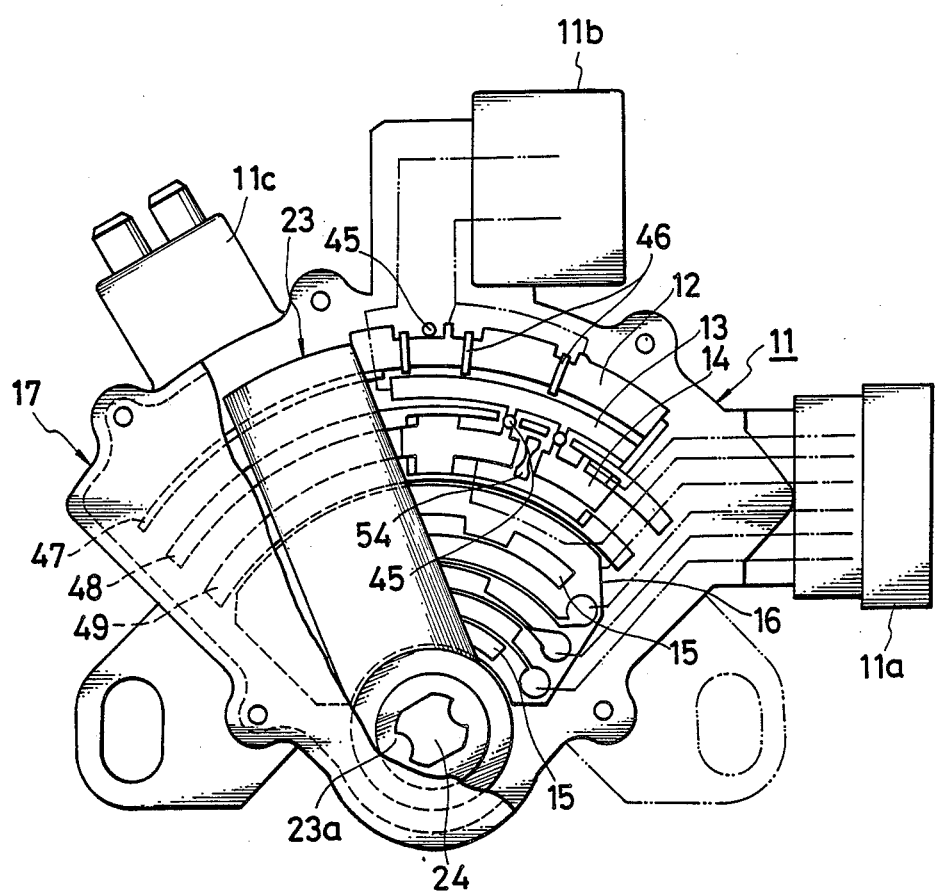
FIG. 1 is a partial fragmentary plan view showing an embodiment of a switch according to the present invention.
Figure 2:
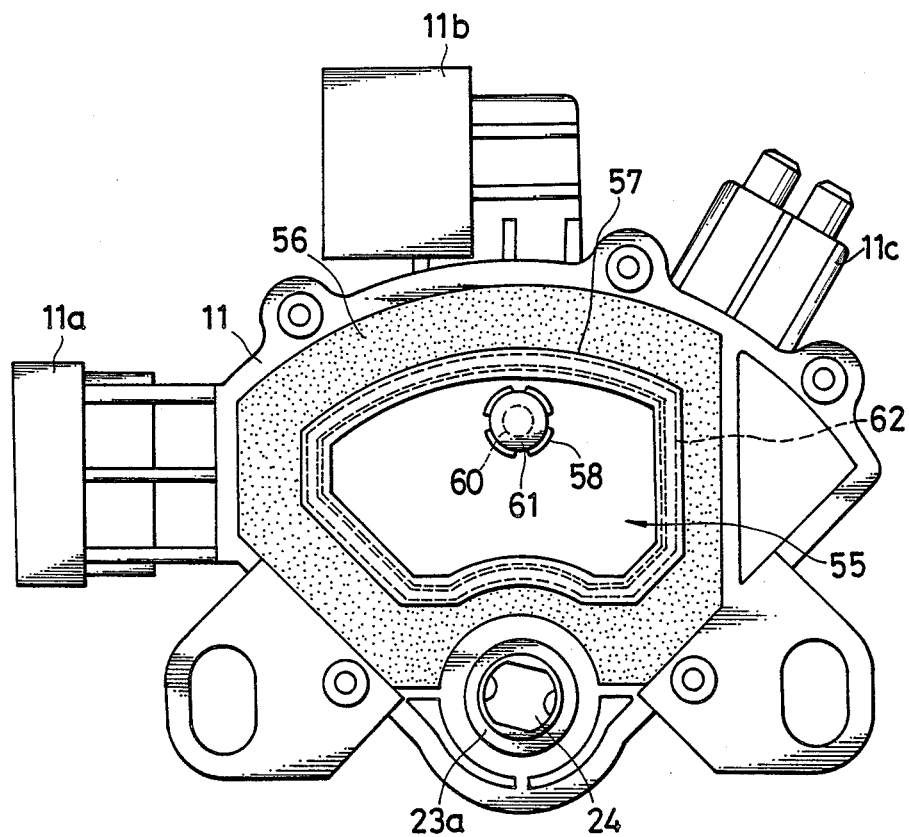
FIG. 2 is a bottom view of the switch.
Figure 3:
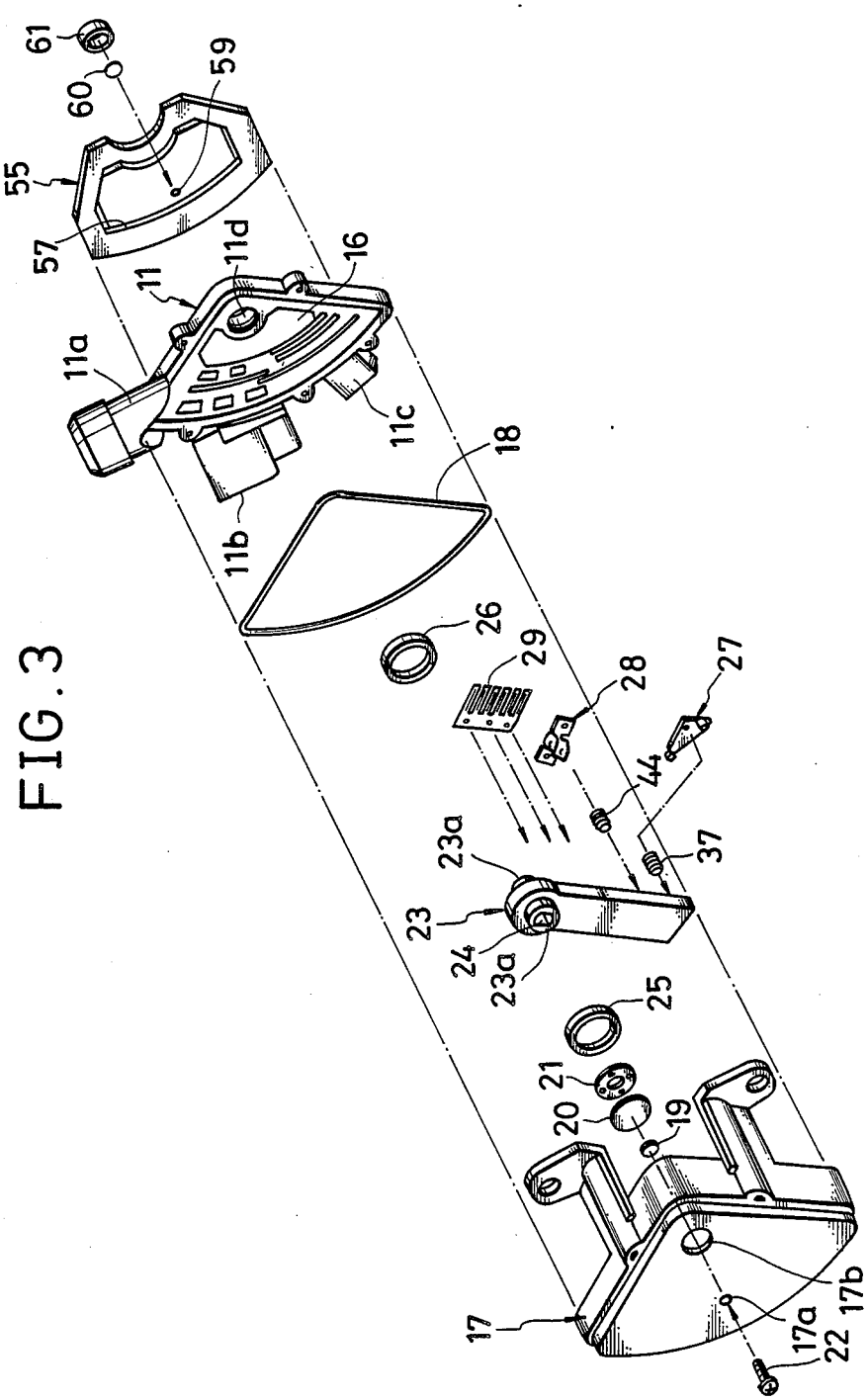
FIG. 3 is an exploded perspective view of the switch.
Figure 4:
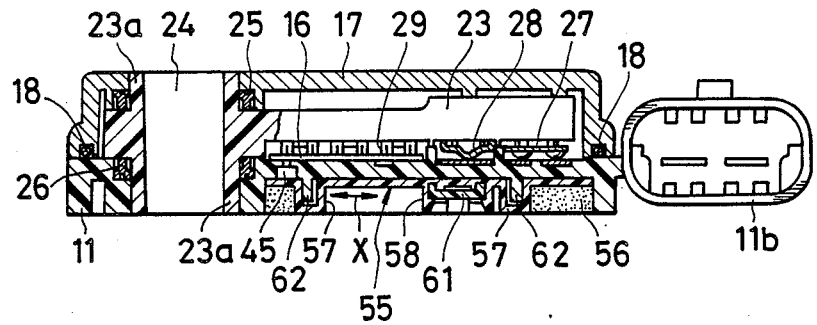
FIG. 4 is a sectional view of the switch.
Figure 5:
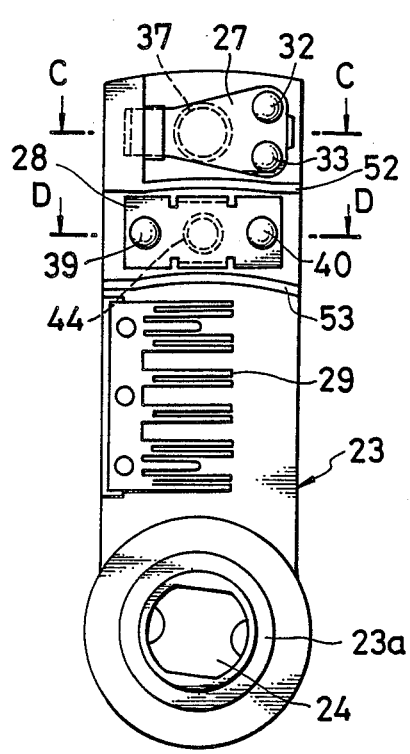
FIG. 5 is a bottom view of the holder of the switch.
Figure 6:
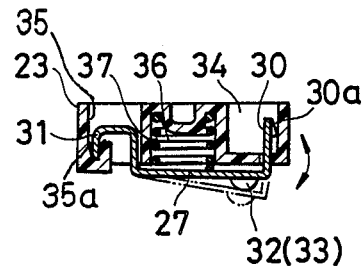
FIG. 6 is a sectional view taken along the line 6—6 of FIG. 5.
Figure 7:
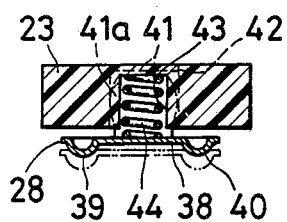
FIG. 7 is a sectional view taken along the line 7—7 of FIG. 5.
Figure 8:
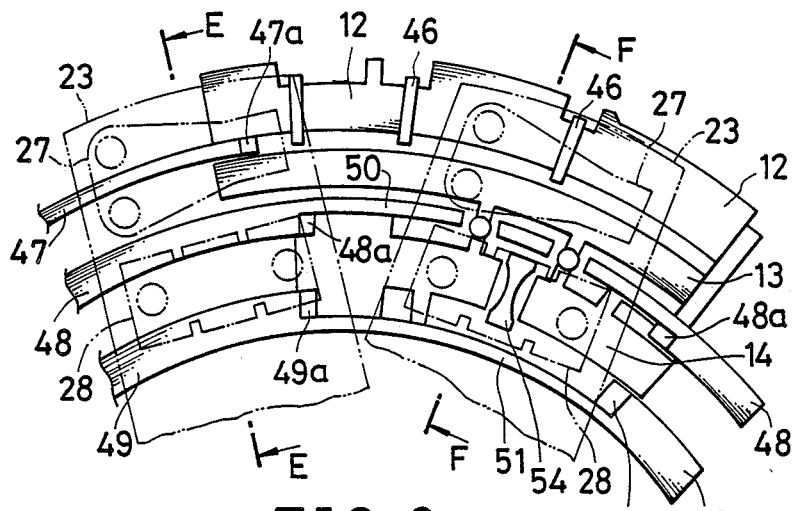
FIG. 8 is a plan view showing the positional relationship between a wiring pattern and a conductor plate.
Figure 9:
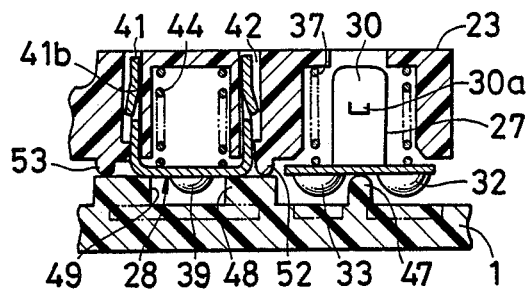
FIG. 9 is a sectional view taken along the line 9—9 of FIG. 8.
Figure 10:
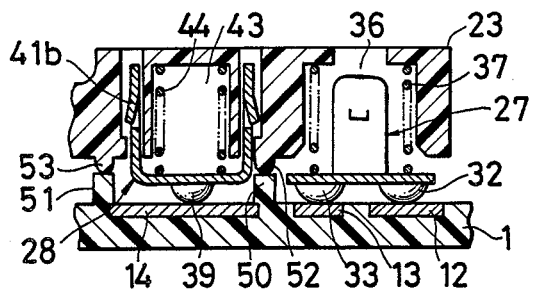
FIG. 10 is a sectional view taken along the line 10—10 of FIG. 8.
Figure 11:
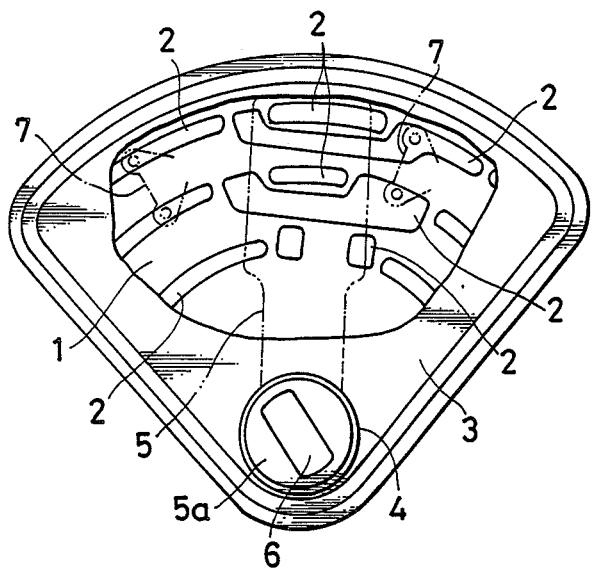
FIG. 11 is a partial fragmentary plan view showing a conventional switch.
Figure 12:
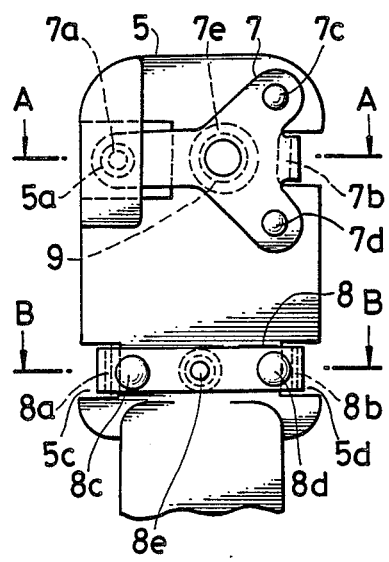
FIG. 12 is a bottom view of the holder of the conventional switch.
Figure 13:
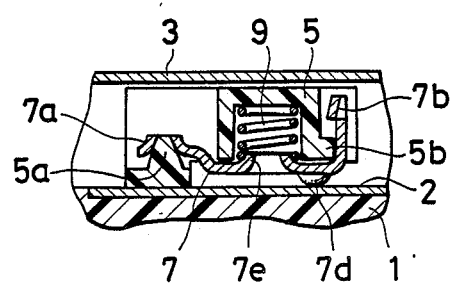
FIG. 13 is a sectional view taken along the line 13—13 of FIG. 12.
Figure 14:
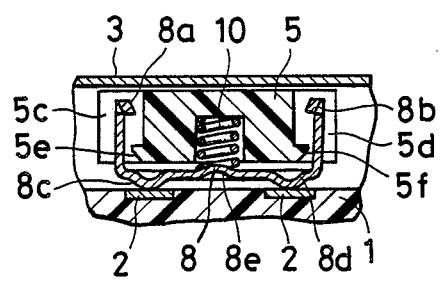
FIG. 14 is a sectional view taken along the line 14—14 of FIG. 12.

FIG. 1 is a partial fragmentary plan view showing an embodiment of a switch according to the present invention; FIG. 2 is a bottom view of the switch; FIG. 3 is an exploded perspective view of the switch; FIG. 4 is a sectional view of the switch; FIG. 5 is a bottom view of the holder of the switch; FIG. 6 is a sectional view taken along the line 6—6 of FIG. 5; FIG. 7 is a sectional view taken along the line 7—7 of FIG. 5; FIG. 8 is a plan view showing the positional relationship between a wiring pattern and a conductor plate; FIG. 9 is a sectional view taken along the line 9—9 of FIG. 8; and FIG. 10 is a sectional view taken along the line 10—10 of FIG. 8.

In the drawings, reference numeral 11 denotes a synthetic resin substrate of substantially sector shape of planar form, and connectors 11a, 11b and 11c are projected from the peripheral surface thereof. A plurality of fixed contacts formed as wiring patterns groups 12, 13, 14 and 15 are concentrically disposed on the surface of the substrate 11. Of the wiring pattern groups, the outer three rows of wiring patterns 12, 13 and 14 are formed by outsert-molding a copper plate to the substrate 11, and used as fixed contacts for a relatively large current. On the other hand, the group of a plurality of inner wiring patterns 15 inside the wiring pattern 14 are formed by etching and patterning a copper foil on a circuit substrate 16 attached to the substrate 11 for use as a fixed contact for a relatively small current.

Numeral 17 denotes a metal cover of substantially sector shape of planar form. As shown in FIG. 4, the substrate 11 is covered through a rubber ring 18 with the cover 17, and they are bonded to be integrated with screws, not shown. As shown in FIG. 3, a threaded opening 17a is formed at the central position of the cover 17, and a clamper 21 is so fixed through a metal retainer 19 and a rubber sealer 20 to the rear surface of the cover 17 so as to seal the threaded opening 17a. A temporary clamping screw 22 is engaged externally of the cover 17 within the threaded opening 17a, and the clamping screw 22 is clamped to act the pressing force through the retainer 19 and the sealer 20 to a holder to be described later.

Numeral 23 denotes a synthetic resin holder, and a cylindrical shaft 23a having an operation opening 24 is projected at the center at one end of the holder 23. The shaft 23a is rotatably inserted through packings 25 and 26 to the rotary openings 17b opened at the substrate 11 and the cover 17. Accordingly, the upper surface side of the substrate 11 is hermetically sealed through the rubber ring 18, the sealer 20 and both the packings 25 and 26 in a waterproof structure, the lower surface of which will be described later.

As shown in FIG. 5, first and second conductor plates 27 and 28 and a slider 29 are sequentially held from the outside toward the inner operation opening 24 on the rear surface of the holder 23. The first conductor plate 27 is opposed to the above-described outermost periphery and the inner wiring patterns 12, 13. The second conductor plate 28 is further opposed to the inner wiring pattern 14, and the slider 29 is opposed to the group of the wiring patterns 15 on the circuit substrate 16.

As apparent from FIG. 6, an erecting piece 30 having an engaging pawl 30a is bent to be formed at one end of the first conductor plate 27; an engaging piece 31 of lower circular-arc shape is bent downward to be formed at the other end, and two (movable contacts) 32, 33 are swelled to be formed near the erecting piece 30 of the lower surface. On the other hand, an engaging opening 34 is formed at the lateral end of the holder 23, a mounting opening 35 having a V-shaped sectional engaging groove 35a is formed in the inner bottom thereof, and a spring containing opening 36 is formed between the engaging opening 34 and the mounting opening 35. The first conductor plate 27 is mounted at the holder 23 together with a coiled spring 37 so that the engaging piece 31 is engaged within the engaging groove 35a. When the engaging pawl 30a is contacted with the inner bottom of the engaging opening 34, it can prevent the holder 23 from dropping therefrom. In this case, the first conductor plate 27 is rotatable in the direction designated by an arrow in FIG. 6 with the engaging groove 35a as a fulcrum. Because the engaging piece 31 is formed in a circular-arc shape the first conductor plate 27 is also rotatable in a direction perpendicular to this paper in FIG. 6 with the engaging groove 35a as a fulcrum.

As apparent from FIG. 7, the second conductor plate 28 has a flat plate 38 of substantially track shape in a planar form. Movable contacts 39 and 40 are swelled at both longitudinal ends of the flat plate 38, and a pair of engaging pieces 41 are bent upward at both lateral ends. Semicircular projection 41a are formed at both side edges of the engaging pieces 41, and engaging pawls 41b are externally projected at the tops of both the engaging pieces 41 in FIGS. 9 and 10. Additionaly, a pair of mounting openings 42 are formed at a predetermined interval longitudinally at the holder 23; a step is formed at the inner bottom of the mounting opening 42, and a spring containing opening 43 is formed between both the mounting openings 42. The second conductor plate 28 is mounted at the holder 23 together with the coiled spring 44 so that both the engaging pieces 41 are inserted into both the mounting openings 42, and the engaging pawls 41b are contacted with the steps of the inner bottoms of the mounting openings 42 to prevent them from dropping from the holder 23. In this case, the second conductor plate 28 can be both elevationally moved by guiding the projections 41a to the inner wall of the mounting opening 42, and rotated in a seesaw manner along the surface parallel to the paper in FIG. 7 with the projection 41a as a fulcrum.

When the wiring patterns 12, 13 and 14 are outsertmolded into the substrate 11, they are partly connected to be integrated; after molding, the connecting sections are cut by pressing and rectangular openings such as 45 and 46 in FIG. 1 the fixed contacts are thereby patterned so as not to be guided to the connectors 11a, 11b and 11c. Thus, various openings 45, 46 are formed by the pressing at the substrate 11, but the openings 45, 46 are blocked by a cover to be described later.

The wiring patterns 12, 13 and 14 formed as described above are so extended, as shown in FIG. 8, that the outermost peripheral wiring pattern 12 is extended as a pair of fixed contacts along the rotating direction of the holder 23; the inner wiring pattern 13 is used as a common terminal and the inner wiring pattern 14 is further extended as a pair of fixed contacts along the rotating direction of the holder 23. The contacts 32 and 33 of the first conductor plate 28 are slid on both the wirings patterns 12 and 13. Both the contacts 39 and 40 of the second conductor plate 27 are slid on the wiring pattern 14 and the slider 29 is slid on the group of the wiring patterns 16 of the circuit substrate 15 upon rotation of the holder 23, and a desired switching operation is conducted in response to the rotating position of the holder 23. In this case, the group of the wiring pattern 15 is extended substantially over the entire periphery of the rotating range of the holder 23, but the excessive wiring patterns 12, 13, and 14 are extended only part of the rotating range of the holder 23. Accordingly, the first and second conductor plates 27 and 28 are slid on the substrate 11 where the wiring patterns 12, 13 and 14 do not extend as will be described later.

Three ribs 47, 48 and 49 are concentrically projected along the area that the wiring patterns 12, 13 and 14 do not extend on the substrate 11 at the rotary opening 11d as a center. The rib 47 on the outermost periphery has relatively narrow width and a tapered surface 47a formed at the end thereof rib 47 is disposed between both the wiring patterns 12 and 13. The ribs 48 and 49 of the central and innermost sides are wider than the rib 47. Tapered surfaces of ribs 48 and 49, 48a and 49b are formed where the ribs connect with narrower sliding projections 50 and 51 which are projected on the inner and outer peripheries of the wiring pattern 14 of both. Two projections 52 and 53 are formed on the rear surface of the holder 23 corresponding to the sliding projections 50 and 51 in FIG. 5, and the continuing surfaces formed partly with the sliding projections 50, 51 and both the ribs 48, 49 function as the sliding surfaces of the projections 52 and 53, respectively.

As shown in FIG. 8, a slit 54 made of a groove or an opening for positively insulating both fixed contacts of the wiring pattern 14 is formed between the fixed contacts. The slit 54 is formed substantially in a hour glass shape of planar form in such a manner that both the ends thereof are uirdest and the slit 54 gradually narrows toward its center. Both the contacts 39 and 40 of the second conductor plate 28 slide at the center of the wiring pattern 14 and the slit 54. In this case, the width of the center of the slit 54 is formed to be smaller than the radial size of both the contacts 39 and 40 so that these contacts not to drop do into the slit 54. On the other hand, the widths of both sides of the slit 54 are formed to be substantially the same size as the radial portion of both the contacts 39 and 40 in order to increase the insulating distance and to function as a reservoir for wearing powder adhered to both the contacts 39 and 40.

As shown in FIGS. 2 to 4, the rear surface of the substrate 11 is covered with a cover 55, and the peripheral edge thereof is fixed to the substrate 11 with an adhesive 56, such as epoxy resin. The cover 55 is formed of synthetic resin having more resiliency than that of the substrate 11, and the resilient projection 57 of recess section is annularly formed integrally. Further, a plurality of engaging pieces 58 are suspended from the section surrounded by the resilient projection 57, and a through hole 59 is perforated at the center thereof. Further, a cap 61 is so fixed through a sealer 60 to the engaging piece 58 as to seal the through hole 59. On the other hand, a bank wall 62 is annularly projected on the rear surface of the substrate 11, and the bank wall 62 is intruded into the resilient projection 57. The engaging state of the bank wall 62 and the resilient projection 57 is not tight, but a small clearance is formed inside. Accordingly, various openings 45, 46 formed by the pressing of the substrate 11 are blocked by the cover 55 and the adhesive 56 to also provide a waterproof structure at the lower surface of the substrate 11.

When assembling the switch described above, the holder 23, the cover 17, the cover 55, etc. are sequentially assembled on the substrate 11 to obtain the switch shown in FIG. 1. Since the holder 23 is rotatable on the substrate 11 in this state, inspections necessary for the switch, such as the disconnections, the shortcircuits of the wiring patterns 12, 13, 14 and 15 can be conducted.

Then, a jig is inserted into the operation opening 24 of the holder 23; the holder 23 is rotated to the central position, and the holder 23 is correctly positioned to the central position of the substrate 11 according to electrical or mechanical reference positioning means. Thereafter, the temporary clamping screw 22 is clamped to press the holder 23 toward the substrate 11 so as to temporarily block the rotation of the holder 23.

The switch is delivered and conveyed in such a temporarily clamped state, associated in a vehicle, and connected to a shift lever (not shown) associated at the neutral position through a connecting pin to be inserted into the operation opening 24. Accordingly, the holder 23 can be coupled at a correct angle in response to the positions of the shift lever, and when the clamping screw 22 is loosened after coupling in this manner, the clamping is released.

After the clamping is released, when the driver moves the shift lever to a predetermined position, the holder 23 is rotated with the shaft 23a as its center in cooperation therewith, the first and second conductor plates 27 and 28, and the slider 29 are separably contacted with the corresponding wiring patterns 12, 13, 14 and 15 to produce desired signals, such as position signals, back-light signals, etc.

In this case, the first conductor plate is moved along the extending direction of the wirings patterns 12, 13 of the two outer rows, and both the contacts 32 and 33 of the first conductor plate 27 are, as shown in FIG. 10, effected by the resilient strength of the coiled spring 37 to slide the wirings patterns 12 and 13 in the contact switching range from which the wiring patterns 12, 13 are extended. On the other hand, since the lower surface of the first conductor plate 27 is ridden on the rib 47 through the tapered surface 47a to slide on the upper surface of the rib 47 as shown in FIG. 9 in the range where the wiring patterns 12, 13 do not extend, irrespective of the contact switching. Both the contacts 32 and 33 are separated from the surface of the substrate 11, thereby eliminating wear of the contacts 32, 33 in this range.

Similarly, the second conductor plate 28 moves along the extending direction of the wiring pattern 14, and the second conductor plate 28 moves inside both the sliding projections 50 and 51 as shown in FIG. 10 in the switching range of the contact. Both the contacts 39 and 40 are effected by the resilient strength of the coiled spring 44 to slide on the substrate 11 and the wiring pattern 14. In this case, since the slit 54 is formed between the pair of fixed contacts of the wiring pattern 14, the insulating distance between both the fixed contacts is increased, and since the center of the slit 54 is formed to be narrow, the contacts 39, 40 do not drop into to the slit 54 and thereby decrease the usual deterioration and wear of the contacts 39, 40. Furthermore, the wearing powder adhered to the contacts 39, 40 is deposited in the wide portions of both sides of the slit 54. Thus, a shortcircuit between both the fixed contacts due to the wearing powder can be prevented for a long period of time. In addition, since both sides of the lower surface of the second conductor plate 28 are slid on the upper surfaces of the ribs 48 and 49 through the tapered surfaces 48a and 49a as shown in FIG. 9 in the range irrespective of the contact switching, both the contacts 39 and 40 are separated from the surface of the substrate 11, and wearing of the contacts 39 and 40 in this range is eliminated.

The slider 29 moves along the extending direction of the group of the wiring patterns 15 provided on the inner circuit substrate 16, but since the group of the wiring patterns 15 is extended over the entire circumferential direction of the substrate 11, the contacts are switched in response to the rotating position of the holder 23.

When the environmental temperature is varied after the switch is associated in the vehicle, an elongating or contracting force acts in the direction of the arrow X in FIG. 4 perpendicular to the thickness of the cover 55. The resiliency of the switch is due to the difference in the thermal expansion coefficients of the substrate 11 and the cover 55 which are made of different materials. In this case, since the resilient projection 57 of recess section formed on the cover 55 is engaged with the bank wall 62 of the substrate 11, when a contracting force is acted, for example, on the cover 55, the contraction force is absorbed by the central deflection of the vertical wall inside the resilient projection 57. When an elongating force is acted on the cover 55, the elongating force is absorbed by the radial outer deflection of the vertical wall inside the resilient projection 57 in the clearance. In any case, because almost no force is acted on the adhesive 56, the adhesive 56 can be prevented from separating. Further, according to the present invention, since the slit 54 which is narrowest at the center and widened toward the outside is formed between the fixed contacts extended in the sliding direction of the conductor plate, the dropping of the movable contact into the slit is suppressed and wearing powder is efficiently deposited in the slit. Therefor a switch in which a shortcircuit defect can be prevented for a long period of time without loss of the sliding contact can be provided. The various openings 45, 46 formed at the substrate 11 are effectively and the cover 17 sealed by the rubber ring 18 at the upper surface of the substrate 11, and by the cover 55 fixed by the adhesive 56 at the lower surface of the substrate 11, and interior air is taken in or exhausted at the cover 17 by the sealer 20 and at the cover 55 by the sealer 60, thereby producing a very tightly sealed switch.

In the embodiment described above, the rotary switch for the transmission has been described. However, the present invention can also be applied to other switches, such as a slide switch, etc.

According to the present invention as described above, the movable contacts of the conductor plates are separated from the surface of the substrate by the ribs in the range irrespective of the contact switching. Consequently, wearing of the movable contacts can be reduced, and a switch which has high on/off switching accuracy can be provided.

What is claimed is:

1. A rotary switch comprising:
a synthetic resin substrate;
a plurality of fixed contacts arranged on the surface of said substrate;

a holder mounted on said substrate and movable over said fixed contacts and a further portion of said substrate not covered by said fixed contacts;

a movable conducting plate supported to said holder;

contact elements formed on said movable conducting plate and in sliding engagement with said fixed contacts such that the rotary switch is switched on by rotating said holder and thereby contacting at least two movable contact elements with said fixed contacts;

a rib projecting upwards from said substrate and positioned so that said movable conducting plate contacts said rib when the switch is in the off position, thereby raising said movable contact elements from the surface of said substrate;

said fixed contacts formed with curved ends and said substrate formed with a groove whereby a substantially planar, hour glass shaped slit is formed between said fixed contacts to be narrowest coincident with the sliding locus of said contact elements and widest outside the sliding locus so that the wider portions of said slit act as reservoirs for conductive wearing powder, thereby delaying a short circuit due to wearing powder accumulation.

2. A rotary switch comprising:

a substantially sector shaped synthetic resin substrate;

a plurality of wiring patterns forming fixed contacts concentrically arranged on the surface of said substrate;

a synthetic resin holder mounted on said substrate movable over the fixed contacts and a further portion of said substrate and caused to rotate about an axis at the vertex of said sector shaped substrate;

at least two movable conducting plates resiliently supported to said holder;

swelled contact elements formed on said movable conducting plates and in sliding engagement with said fixed contacts such that said rotary switch is switched on by rotating said holder and thereby contacting at least two movable contact elements with said fixed contacts;

ribs projecting upwards from said substrate and positioned along the arcuate path projected by said fixed contacts but in a region where said fixed contacts do not extend so that said conducting plates contact said ribs when the switch is in the off position, thereby raising said movable contact elements from the surface of said substrate.

3. The rotary switch defined in claim 2, further including:

said fixed contacts formed with curved ends and said substrate formed with a groove whereby a substantially planar, hour glass shaped slit is formed between said fixed contacts to be narrowest coincident with the sliding locus of said contact elements and widest outside the sliding locus so that the wider portions of said slit act as reservoirs for conductive wearing powder, thereby delaying a short circuit due to wearing powder accumulation.

* * * * *